Sept. 10, 1946.　　　G. O. CONNER　　　2,407,253
FORMING MACHINE
Filed Oct. 28, 1943　　　　　2 Sheets-Sheet 2
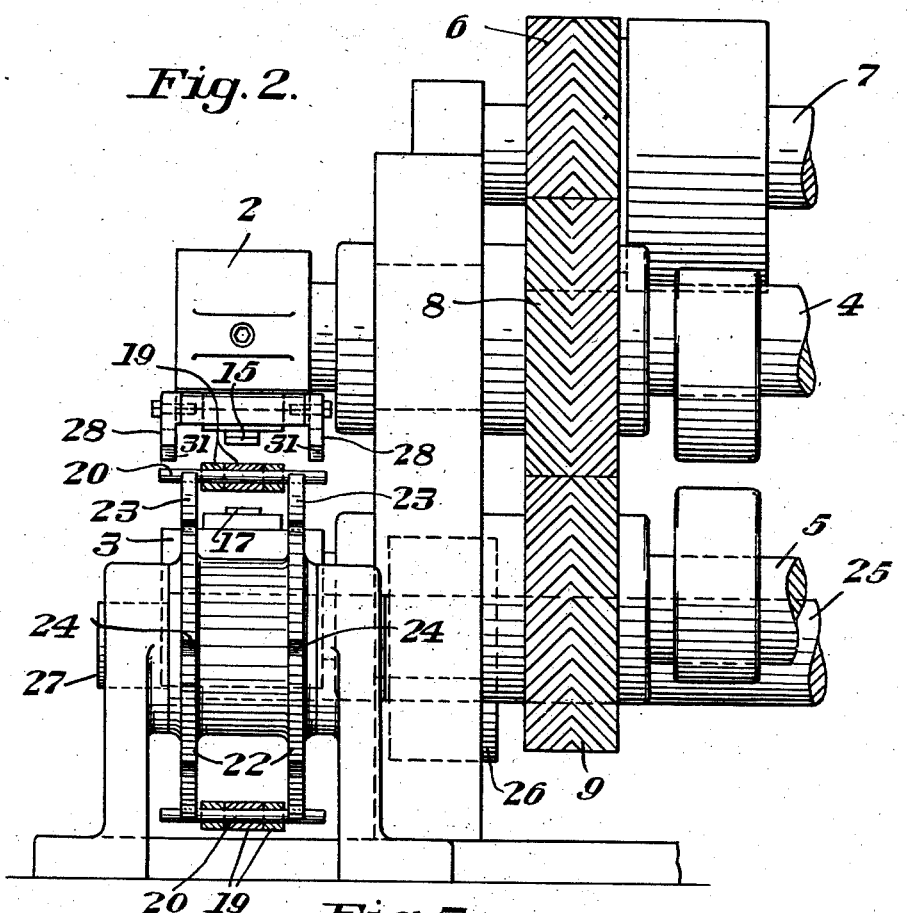
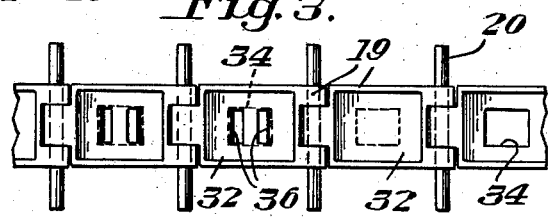
INVENTOR
Guy O. Conner Patented Sept. 10, 1946

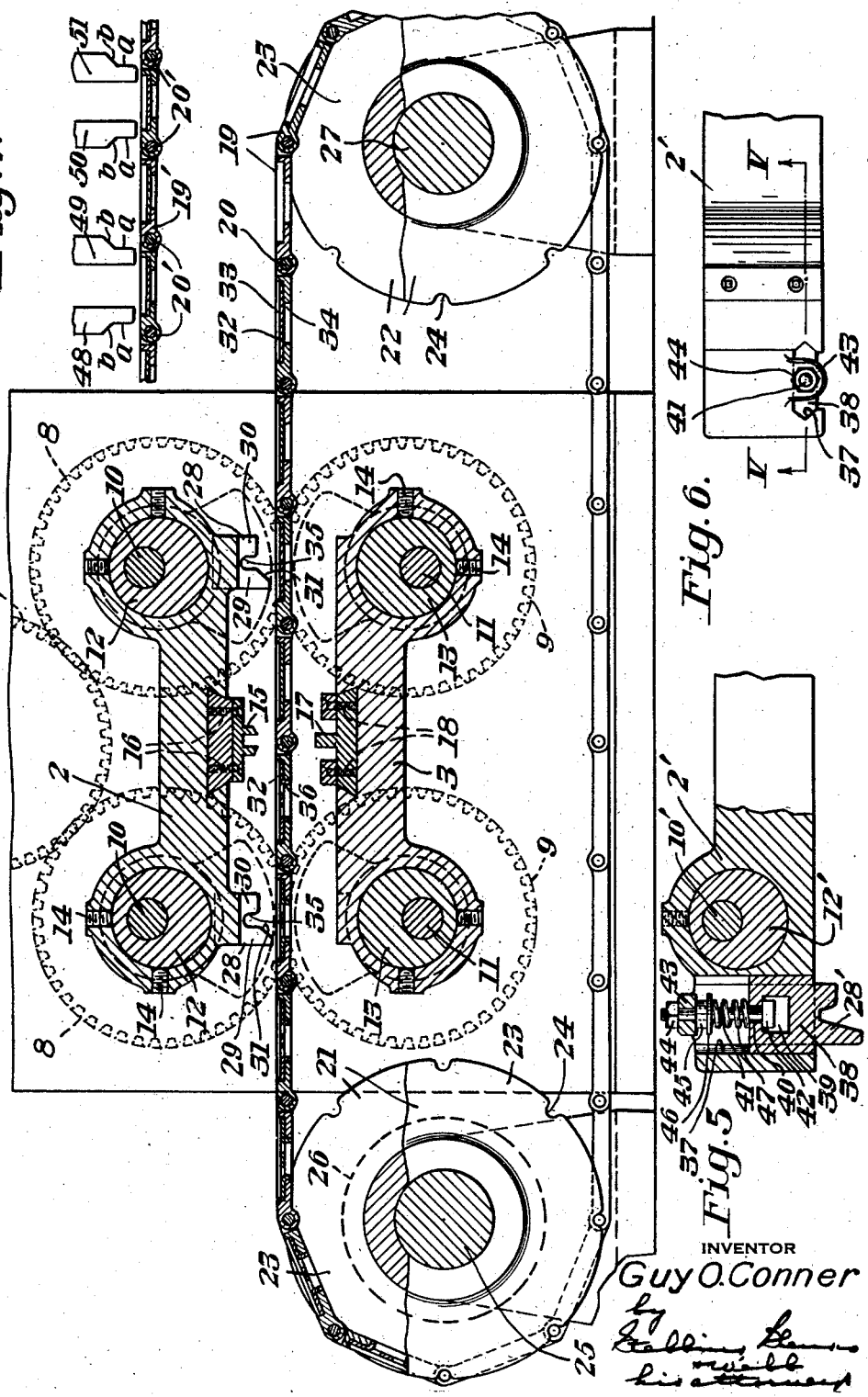

2,407,253

UNITED STATES PATENT OFFICE 2,407,253

FORMING MACHINE

Guy O. Conner, Wheeling, W. Va.

Application October 28, 1943, Serial No. 507,937

31 Claims. (Cl. 164—20)

This invention relates to forming machines and particularly to forming machines of the type disclosed in my copending application Serial No. 497,792. In my said application there is disclosed a forming machine for high speed operation employing heads movable toward and away from each other and when closest together moving also laterally generally in the same direction for acting upon work fed between the heads. Such a machine may be used in various arts, as, for example, stamping, die forming, plastic molding, ceramic molding, extrusion, printing, etc.

The present invention has to do particularly with the controlling or guiding of work passing through a forming machine. While the subject matter of the present application is illustrated as employed with a machine as disclosed in said application Serial No. 497,792, the invention is not so limited and, as above indicated, may be employed with other machines.

I provide work guiding or holding means movable between the heads of a forming machine and whose movement at the time the heads operate on the work is controlled in novel manner, preferably by means on one of the heads. I also provide work guiding or holding means movable between the heads and comprising sections connected together. The sections may desirably be hingedly connected and I find it convenient to link the sections together into an endless chain. Each section is preferably rigid and may serve as a die as well as a work holder. An advantage of such an arrangement is that the manifold advantages of the forming machine of my said copending application or a similar machine can be obtained when individual blanks as distinguished from continuous strip are being acted on. By the use of the device herein disclosed the extremely high speed operation of the machine described in my said copending application may be obtained when individual previously cut blanks are being acted on.

I preferably provide driving means for the work guiding or holding means, said driving means being separate from the heads, and I also provide means on at least one of the heads for engaging the work guiding or holding means during successive cycles of operation of the machine to insure proper positioning of each blank relatively to the heads at the instant the blank is acted on. I preferably provide means for rendering temporarily inoperative the separate driving means so that the means carried by one of the heads takes over the function of driving or advancing the work guiding or holding means during a portion of each cycle. To this end I find it advantageous to employ a free wheeling clutch between the shaft which operates the separate driving means and the portion of such driving means which engages the work guiding or holding means, and the speed of the separate driving means is controlled so as to be slightly slower than the speed of lateral movement of the heads at the time when they operate on the work. Thus through the free wheeling clutch the separate driving means will be temporarily rendered inoperative during the short interval when the heads are acting on the work and also during the advance of the work guiding or holding means.

Other details, objects and advantages of the invention will become apparent as the following description of certain present preferred embodiments thereof proceeds.

In the accompanying drawings I have shown certain present preferred embodiments of the invention, in which Figure 1 is a vertical longitudinal cross-sectional view through a forming machine;

Figure 2 is an end view of the machine shown in Figure 1 as viewed from the right-hand end of Figure 1;

Figure 3 is a detail plan view of the work guiding or holding means;

Figure 4 is an enlarged cross-sectional view of one of the sections of the work guiding or holding means;

Figure 5 is a fragmentary detail cross-sectional view of a modified form of structure, taken on the line V—V of Figure 6;

Figure 6 is a plan view of the structure shown in Figure 5; and

Figure 7 is a fragmentary diagrammatic view illustrating another modified structure.

Referring now more particularly to the drawings, there is shown a forming machine of the same general type as is disclosed in my said copending application. For the sake of clarity I have omitted details of the portion of the machine which is concerned with operation of the heads since the present invention is not concerned with such details. The upper head is shown at 2 and the lower head at 3. Each of the heads is carried and operated by two shafts which are driven in unison, such shafts having thereon eccentric means which impart to the heads their operative movements. The upper head 2 is carried by two shafts 4 and the lower head 3 is carried by two shafts 5. In the machine shown in the drawings the axes of the shafts 4 lie in the same horizontal plane and the axes of the shafts 5 lie in another horizontal plane; also each of the shafts 4 is positioned directly above one of the shafts 5, as shown in Figure 1. Both shafts 4 are driven in the same direction, i. e., clockwise viewing Figure 1, at the same speed, and both shafts 5 are driven in the same direction, i. e., counterclockwise viewing Figure 1, at the same speed as the shafts 4. This driving of the shafts 4 and 5 may be accomplished in various ways, a driving gear 6 being shown as being keyed to a driving shaft 7 and meshing with two gears 8, one keyed to each of the shafts 4, which gears 8 in turn respectively mesh with gears 9, one keyed to each shaft 5. All four of the gears 8 and 9 are of the same diameter.

Formed integrally with the forward end of each of the shafts 4 and 5, i. e., the end nearest the eye viewing Figure 1 and the end toward the left viewing Figure 2, is an eccentric pin. The eccentric pins on the shafts 4 are designated 10 and the eccentric pins on the shafts 5 are designated 11. Each eccentric pin projects forwardly from the end of the shaft which carries it so that the head 2 is carried on the pins 10 and may be easily removed therefrom and the head 3 is carried on the pins 11 and may be easily removed therefrom. The head 2 carries eccentric bushings 12 adapted to be slipped over the respective pins 10 and the head 3 carries eccentric bushing 13 adapted to be slipped over the respective pins 11. Each of the bushings may be rotated in its head to a desired angular position and maintained in that position by set screws 14. By suitable rotative positioning of the eccentric bushings the clearance between the heads 2 and 3 when they are closest together may be determined. The shafts 4 have their eccentric pins 10 similarly oriented relatively to the shaft axes and also the eccentric bushings 12 are similarly oriented so that upon rotation of the shafts 4 the head 2 will, while maintaining its orientation, be moved through a circular path. The same applies with respect to the lower head 3. Also the shafts 4 will ordinarily have their eccentric pins 10 turned 180° from the corresponding positions of the eccentric pins 11 on the shafts 5 and the eccentric bushings on all four pins will be arranged so that in operation the upper and lower heads partake of opposed synchronous movement, approaching each other during the same interval, reaching their respective positions in which each is nearest the axes of the shafts of the other at the same time and the heads when closest together moving laterally in the same direction, i. e., toward the left viewing Figure 1.

In the structure shown a die 15 is connected with the upper head 2 by screws 16 and a die 17 is connected with the lower head 3 by screws 18. When the heads come together the dies act on work positioned therebetween, but during the interval while the dies are acting on the work both the work and the dies are moving laterally. The particular conformation of the work engaging portions of the dies forms no part of the present invention and the dies may be designed to perform any desired work. In Figure 1 the heads 2 and 3 and the dies 15 and 17 are shown in their farthest apart position. As they move toward each other and toward the point of engagement with the work they move also first toward the right and then toward the left so that at the point of maximum penetration of the work they are in the same relative lateral position as shown in Figure 1.

The work guiding or holding means in the form of structure shown in the drawings comprises sections 19 hingedly connected together so that they form an endless chain. The hinge pins connecting the sections together are shown at 20. The pins are longer than the width of the sections and project from both ends thereof, as clearly shown in Figures 2 and 3, for a purpose presently to be described. The endless chain comprising the hingedly connected sections 19 is trained about sprockets 21 and 22. Each of the sprockets has spaced projecting chain engaging portions 23 provided with recesses 24 engaging about the projecting ends of the pins 20 as shown in Figures 1 and 2. The sprocket 21 is keyed to a driving shaft 25 driven from any suitable source of power and a free wheeling clutch designated diagrammatically at 26 and which may be of any well known construction is interposed between the shaft 25 and the sprocket 21. By reason of the interposition of the free wheeling clutch 26 between the shaft 25 and the sprocket 21 the shaft drives the sprocket except when the sprocket is caused to turn in the same direction as that in which the shaft is driven but at higher speed, the free wheeling clutch permitting the sprocket to turn at higher speed than the shaft. The reason for this will presently become apparent. The sprocket 22 is keyed to an idler shaft 27 and a brake (not shown) may be applied to the shaft 27 to insure that the upper reach of the chain is taut between the sprockets 21 and 22, i. e., assumes a substantially horizontal position between the sprockets, as shown in Figure 1.

The head 2 carries two pairs of downwardly facing forks 28, the forks of each pair being spaced apart in a direction crosswise of the endless chain as shown in Figure 2 so as to be adapted to embrace the projecting ends of the pins 20. The pairs of forks are spaced apart longitudinally of the chain a distance equal to a multiple of the length of one of the sections 19. Such multiple may be one, two, three or more. In the form shown the pairs of forks are spaced apart a distance equal to three times the length of one of the sections. Each fork has a relatively long leg 29 and a relatively short leg 30. The lower portion of the inner face of the relatively long leg 29 is inclined to the axis of the fork, as shown at 31.

The operation of the machine is as follows. The driving shafts 7 and 25 operate continuously while the machine is at work. Thus the heads 2 and 3 rotate continuously in the manner above described, moving toward and away from each other, and at the time they are closest together moving parallel to the upper reach of the chain consisting of the hingedly connected sections 19 and toward the left viewing Figure 1. The shaft 25 through the sprocket 21 drives the chain in the counterclockwise direction viewing Figure 1. The linear speed of movement of the chain is very slightly less than the horizontal component of the movement of the heads 2 and 3 toward the left at the time when they are closest together.

During operation of the machine work in the form of individual previously cut blanks 32 is fed to the machine, one blank being positioned in each of the sections 19. In the form shown each of such sections has a recess 33 of such shape as to receive one of the blanks 32. Each section also has a central opening 34 therethrough as shown in Figures 1 and 4. The blanks may be fed by hand or by automatic feeding means as desired. A blank is deposited in the recess 33 of each section 19 when the section assumes approximately a horizontal position prior to moving through the machine.

As above stated, the heads 2 and 3 are shown in Figure 1 in the position in which they are farthest apart. As the heads move toward one another, being driven by the shaft 7, the endless chain made up of the sections 19 is moved toward the left, being driven by the shaft 25. As the heads approach the chain the forks 28 are positioned substantially above certain of the pins 20. The inclined surfaces 31 of the forks assist the forks in seating themselves on and embracing the pins. As the heads approach the position in which they are closest together the component of movement of the heads in the direction of movement of the upper reach of the chain, i. e., toward the left viewing Figure 1, is approximately the same as the linear speed of the chain and when the heads are closest together said component is slightly greater than the speed imparted to the chain by the shaft 25. When the heads are closest together the pins with which the forks cooperate enter the narrow necks 35 of the forks and the forks closely embrace the pins. When the pins are thus positioned in the forks the speed of movement of the chain is the same as the component of the speed of movement of the heads in the direction parallel to the upper reach of the chain. This insures proper positioning of the work when the dies 15 and 17 act on the work.

As above indicated, the particular shape of the dies disclosed forms no part of the present invention. The upper die 15 has two downward projections which straddle the upward projection of the lower die 17 to form two openings in the blank 32 and turn the metal adjacent each opening downwardly to form a flange 36 (Figure 4). Thus the sections 19 in the form shown serve not only as guiding or holding means for the work but also as dies cooperating with the dies 15 and 17.

As the heads 2 and 3 move apart the forks 28 move away from the pins 20 with which they have been in guiding and driving engagement during the preceding cycle and in the succeeding cycle each of the forks engages the pin next succeeding the previously engaged pin in the chain. The cycle is repeated as long as the machine continues to operate and at each cycle the work is properly positioned during the time the dies are acting on it.

In Figures 5 and 6 there is shown a modified form of structure. The upper head 2', which is analogous to the head 2 in Figures 1 and 2 and which is similarly mounted through eccentric bushings 12' upon eccentric pins 10' carried by shafts analogous to the shafts 4, is provided with vertical guideways one of which is shown at 37. The guideways are positioned at opposite ends of the head and are for the purpose of guiding yieldingly mounted forks, as will presently be described. Each of the guideways has pointed lateral extremities as clearly shown in Figure 6 so that it will contain and guide vertically therein a slide. A slide 38 is positioned and slidably guided in each of the guideways 37. Each of the slides 38 has a fork 28' at its lower end, such forks being similar to the forks 28 except that the inner surfaces of the legs of the fork are inclined toward one another to the top of the fork.

Formed in each of the slides 38 is a recess 39. A passage 40 extends from the recess 39 upwardly to intersect the upper faces of the slide. A bolt 41 has its head 42 positioned within the recess 39, the shank of the bolt passing through the passage 40 as shown in Figure 5. Connected with the head 2' and extending over each of the guideways 37 at the top thereof is a collar 43. The bolt 41 passes through the collar 43 and has a nut 44 applied thereto above the collar as shown in Figures 5 and 6. Below the collar 43 is a spacer 45 against which bears a washer 46. A compression coil spring 47 bears between the washer 46 and the upper surface of the slide 38.

The normal position of the slides 38 is exemplified by the position of the slide shown in Figure 5. The spring 47 yieldingly urges the slide toward its lowermost position. When the head moves downwardly during operation of the machine the forks 28' cooperate with the work guiding means in the same manner as do the forks 28. However, the springs 47 allow the forks 28' to move yieldingly upwardly relatively to the head 2' when they embrace the chain pins or other portions of the work guiding means, which allows for compensation for wear and insures proper positioning of the work guiding means with respect to the heads at the time when the heads are acting on the work. In other words, the slides 38 are self-compensating for wear.

Instead of positioning forks such as the forks 28 and 28' there may be employed cooperating converging cam surfaces for positioning the work. This is illustrated diagrammatically in Figure 7 in which there is shown a chain designated 19' which may be identical to the chain 19. The chain 19' has hinge pins 20' which may be identical to the hinge pins 20.

The positioning means in Figure 7 comprises four positioning members 48, 49, 50 and 51. These positioning members may be connected with the upper head similarly to the manner in which the forks 28 are connected with the head 2 or similarly to the manner in which the forks 28' are connected with the head 2'. Each of the positioning members 48, 49, 50 and 51 has a chain positioning surface, such surface being that which faces toward the left viewing Figure 7 on members 48 and 50 and that which faces toward the right viewing the same figure on members 49 and 51. Each of such surfaces comprises a vertical portion $a$ and an outwardly and upwardly inclined portion $b$. The members 48, 49, 50 and 51 are spaced so that the positioning surface of each thereof cooperates with one of the hinge pins of the chain as is shown in Figure 7. At least one of such members having its positioning surface facing in one direction and a second member having its positioning surface facing in the opposite direction are employed simultaneously to hold the chain in proper position while the work is being acted on. When the upper head moves down to act on the work the positioning members likewise move down until the inclined portions $b$ thereof engage the hinge pins of the chain, the cooperative effect of such inclined portions on the chain being to properly center and position it during the time the work is being acted on.

It is not necessary to use all four of the positioning members 48, 49, 50 and 51. Any two of such members may be used so long as one of them has its positioning surface facing in one direction and the other has its positioning surface facing in the opposite direction. For example, members 48 and 49 can be used together and members 50 and 51 dispensed with. By the same token, members 50 and 51 can be used and members 48 and 49 dispensed with. As another alternative, members 49 and 50 could be used together or members 48 and 51 could be used together. The converging cam surfaces have a cooperative effect in acting on the chain to hold it against longitudinal movement in either direction during the time the work is being acted on, the inclined positioning portions b wedgingly engaging the hinge pins of the chain to accomplish the result.

While in the forms of the invention illustrated the work guiding or holding means is made up of hingedly connected sections, features of the invention are applicable to the use of a continuous work guiding or holding means. Indeed, while I have shown and described certain present preferred embodiments of the invention it is to be distinctly understood that the invention is not limited thereto but may be otherwise variously embodied within the scope of the following claims.

I claim:

1. A forming machine comprising opposed cooperating forming heads each mounted for generally rotary movement while being guided so as to maintain substantially fixed orientation, said heads during operation of the machine moving toward and away from each other and when closest together moving also laterally generally in the same direction, work guiding means separate from said heads and movable therebetween and means on one of said heads for embracing a portion of said work guiding means to insure movement of said work guiding means laterally with said heads at the time said heads are closest together.

2. A forming machine comprising opposed cooperating forming heads movable toward and away from each other and when closest together moving also laterally generally in the same direction, work guiding means separate from said heads and movable therebetween and means on one of said heads engaging said work guiding means only when said heads are close together to insure movement of said work guiding means laterally with said heads at the time said heads are closest together.

3. A forming machine comprising opposed cooperating forming heads movable toward and away from each other and when closest together moving also laterally generally in the same direction, work guiding means movable between said heads and a guide member on one of said work guiding means and one of said heads and a fork on the other thereof adapted to embrace said guiding member when said heads are close together to insure movement of said work guiding means laterally with said heads at the time said heads are closest together.

4. A forming machine comprising opposed cooperating forming heads movable toward and away from each other and when closest together moving also laterally generally in the same direction, work guiding means separate from said heads and movable therebetween, positioning portions disposed at intervals along said work guiding means and positioning means on one of said heads cooperating successively with said positioning portions to insure at each cycle of operation of the machine movement of said work guiding means laterally with said heads at the time said heads are closest together.

5. A forming machine comprising opposed cooperating forming heads movable toward and away from each other and when closest together moving also laterally generally in the same direction, work guiding means separate from said heads and movable therebetween, positioning portions disposed at intervals along said work guiding means and a pair of spaced positioning devices on one of said heads, said positioning devices being spaced apart a distance equal to the distance between positioning portions on said work guiding means and cooperating successively with positioning portions on said work guiding means to insure at each cycle of operation of the machine movement of said work guiding means laterally with said heads at the time said heads are closest together.

6. A forming machine comprising opposed cooperating forming heads movable toward and away from each other and when closest together moving also laterally generally in the same direction, work guiding means movable between said heads, positioning pins carried by and disposed at intervals along said work guiding means and a pair of spaced positioning forks on one of said heads, said forks being spaced apart a distance equal to the distance between positioning pins on said work guiding means and successively embracing positioning pins on said work guiding means to insure at each cycle of operation of the machine movement of said work guiding means laterally with said heads at the time said heads are closest together.

7. A forming machine comprising opposed cooperating forming heads movable toward and away from each other and when closest together moving also laterally generally in the same direction, work guiding means movable between said heads, said work guiding means comprising sections hingedly connected together, portions of the hinge pins being exposed, and a pair of spaced positioning forks on one of said heads, said forks being spaced apart a distance equal to the distance between hinge pins on said work guiding means and successively embracing the exposed portions of hinge pins on said work guiding means to insure at each cycle of operation of the machine movement of said work guiding means laterally with said heads at the time said heads are closest together.

8. A forming machine comprising opposed cooperating forming heads movable toward and away from each other and when closest together moving also laterally generally in the same direction, work guiding means movable between said heads, said work guiding means comprising sections hingedly connected together, and means on one of said heads engaging said work guiding means at portions thereof disposed progressively therealong to insure at each cycle of operation of the machine movement of said work guiding means laterally with said heads at the time said heads are closest together.

9. A forming machine comprising opposed cooperating forming heads movable toward and away from each other and when closest together moving also laterally generally in the same direction, work guiding means separate from said heads and movable therebetween, means driving said work guiding means when said heads are relatively far apart and means on one of said heads engaging said work guiding means when said heads are close together to drive said work guiding means and insure movement thereof laterally with said heads at the time said heads are closest together.

10. A forming machine comprising opposed cooperating forming heads movable toward and away from each other and when closest together moving also laterally generally in the same direction, work guiding means movable between said heads, means including a free wheeling clutch driving said work guiding means when said heads are relatively far apart and means on one of said heads engaging said work guiding means when said heads are close together to drive said work guiding means while temporarily rendering said free wheeling clutch inoperative and insure movement of said work guiding means laterally with said heads at the time said heads are closest together.

11. A forming machine comprising opposed cooperating forming heads movable toward and away from each other and when closest together moving also laterally generally in the same direction, endless work guiding means positioned with one reach thereof between said heads and means on one of said heads engaging said work guiding means at portions thereof disposed progressively therealong to insure at each cycle of operation of the machine movement of said work guiding means laterally with said heads at the time said heads are closest together.

12. A forming machine comprising opposed cooperating forming heads movable toward and away from each other and when closest together moving also laterally generally in the same direction, endless work guiding means positioned with one reach thereof between said heads, said endless work guiding means comprising sections hingedly connected together, and means on one of said heads engaging said work guiding means at portions thereof disposed progressively therealong to insure at each cycle of operation of the machine movement of said work guiding means laterally with said heads at the time said heads are closest together.

13. A forming machine comprising opposed cooperating forming heads movable toward and away from each other and when closest together moving also laterally generally in the same direction, endless work guiding means positioned with one reach thereof between said heads, said endless work guiding means comprising sections hingedly connected together, portions of the hinge pins being exposed, and means on one of said heads successively embracing the exposed portions of hinge pins disposed progressively along said work guiding means upon successive cycles of operation of the machine to insure at each cycle movement of said work guiding means laterally with said heads at the time said heads are closest together.

14. A forming machine comprising opposed cooperating forming heads movable toward and away from each other and when closest together moving also laterally generally in the same direction, endless work guiding means positioned with one reach thereof between said heads, said endless work guiding means comprising sections hingedly connected together, means driving said work guiding means when said heads are relatively far apart and means on one of said heads engaging said work guiding means at portions thereof disposed progressively therealong when said heads are close together to insure at each cycle of operation of the machine movement of said work guiding means laterally with said heads at the time said heads are closest together.

15. A forming machine comprising opposed cooperating forming heads movable toward and away from each other and when closest together moving also laterally generally in the same direction, work holding means movable between said heads, said work holding means comprising sections connected together, each section having means for positioning a blank or the like therein, and means on one of said heads engaging said work holding means to insure movement of said work holding means laterally with said heads at the time said heads are closest together so that upon operation of the machine said sections each with a blank or the like therein are advanced and successively acted on by said heads.

16. A forming machine comprising opposed cooperating forming heads movable toward and away from each other and when closest together moving also laterally generally in the same direction, work holding means movable between said heads, said work holding means comprising sections hingedly connected together, portions of the hinge pins being exposed, each section having means for positioning a blank or the like therein, and means on one of said heads successively embracing the exposed portions of hinge pins on said work holding means to insure at each cycle of operation of the machine movement of said work holding means laterally with said heads at the time said heads are closest together so that upon operation of the machine said sections each with a blank or the like therein are advanced and successively acted on by said heads.

17. A forming machine comprising opposed cooperating forming heads movable toward and away from each other and when closest together moving also laterally generally in the same direction, work holding means movable between said heads, said work holding means comprising sections connected together, each section having means for positioning a blank or the like therein, driving means for advancing said work holding means, means on one of said heads engaging said work holding means to advance the same laterally with said heads at the time said heads are closest together so that upon operation of the machine said sections each with a blank or the like therein are advanced and successively acted on by said heads and means whereby said driving means is rendered temporarily inoperative when said means on one of said heads advances said work holding means.

18. A forming machine comprising dies linked together to form an endless chain, opposed cooperating forming heads movable toward and away from each other generally in the plane of said endless chain and disposed on opposite sides of one reach thereof, said heads when closest together also moving laterally generally in the same direction parallel to the direction of movement of said reach of said endless chain, and means for advancing said endless chain in synchronism with operation of said heads so that dies adapted to have blanks positioned thereon are successively acted on by said heads in successive cycles of operation of the machine.

19. A forming machine comprising dies linked together to form an endless chain, opposed cooperating forming heads movable toward and away from each other generally in the plane of said endless chain and disposed on opposite sides of one reach thereof, said heads when closest together also moving laterally generally in the same direction parallel to the direction of movement of said reach of said endless chain, and means for advancing said endless chain in synchronism with operation of said heads so that dies adapted to have blanks positioned thereon are successively acted on by said heads in successive cycles of operation of the machine, said means including means on one of said heads successively engaging portions of said dies when said heads are closest together upon successive cycles of operation of the machine.

20. A forming machine comprising opposed cooperating forming heads at least one of which is movable toward and away from the other, work guiding means movable with respect to said heads, a guide member on said work guiding means and a guide member on one of said heads adapted to cooperate with said first mentioned guide member, one of said guide members being yieldingly mounted in the work guiding means or head carrying it, said guide members insuring proper positioning of said work guiding means with respect to said heads at the time said heads are acting on the work.

21. A forming machine comprising opposed cooperating forming heads at least one of which is movable toward and away from the other, work guiding means movable with respect to said heads and cooperating guiding members respectively on said work guiding means and one of said heads, one of said guiding members being yieldingly mounted in the work guiding means or head carrying it, said guiding members interfitting to insure proper positioning of said work guiding means with respect to said heads at the time said heads are acting on the work, said yielding mounting of said one of said guiding members insuring proper cooperation between said guiding members despite wear thereof.

22. In a device of the character described, opposed tool supporting elements one of which is movable relatively to the other, an endless revolvable conveyor for conveying stock to said elements for operation upon said stock by the tools supported by said elements, means for positioning stock on said conveyor, means for driving said conveyor in approximate synchronism with said movement of said movable element and means responsive to relative movement between said movable element and said conveyor for predeterminedly positioning said conveyor with respect to said elements, said means comprising a pair of members one of which presents a converging cam formation and the other of which engages said formation and is located thereby but which is too large to mate with the apex of said formation.

23. In a device of the character described, opposed tool supporting elements one of which is movable relatively to the other, an endless revolvable conveyor for conveying stock to said elements for operation upon such stock by the tools supported by said elements, means for positioning stock on said conveyor, means for driving said conveyor in approximate synchronism with said movement of said movable element and means responsive to relative movement between said movable element and said conveyor for predeterminedly positioning said conveyor with respect to said elements, said means comprising a pair of engaging members one of which is responsive to movement of said movable element and one of which comprises a socket tapered in a direction transverse to the length of the conveyor from relatively great dimension at its mouth to relatively small dimension at its throat for receiving the other of said members, and means for adjusting one of said members toward and away from the other thereof.

24. A forming machine comprising blank carrying dies forming an endless conveyor chain, a forming head movable toward and away from one reach of said chain for supporting a die adapted to coact with said first mentioned dies, and means for driving said chain in synchronism with operation of said head so that the die supported by said head successively acts upon the blanks carried by said blank carrying dies.

25. A forming machine comprising opposed cooperating forming heads movable toward and away from each other and when closest together moving also laterally generally in the same direction, work guiding means in the form of an endless chain movable between said heads and means on one of said heads engaging said work guiding means to insure movement of said work guiding means laterally with said heads at the time said heads are closest together.

26. A forming machine comprising opposed cooperating forming heads movable toward and away from each other and combined work holding means and dies movable between said heads, said combined work holding means and dies comprising sections connected together, each section having means for positioning a blank or the like therein and means against which a portion of the blank or the like is adapted to be formed, so that upon operation of the machine said sections each with a blank or the like therein are advanced and successively acted on by said heads.

27. A forming machine comprising opposed cooperating forming heads at least one of which is movable toward and away from the other, combined work guiding means and dies separate from said heads and movable therebetween, said combined work guiding means and dies guiding work pieces relatively to said heads and having portions against which the work pieces are adapted to be formed, and means on one of said heads engaging said combined work guiding means and dies to insure proper positioning of said combined work guiding means and dies with respect to said heads at the time said heads are acting on the work.

28. In a device of the character described, opposed tool supporting elements one of which is movable relatively to the other, said elements when closest together also moving laterally generally in the same direction, an endless revolvable conveyor for conveying stock to said elements for operation upon such stock by the tools supported by said elements, means for positioning stock on said conveyor, means for driving said conveyor in approximate synchronism with movement of said elements and means responsive to relative movement between said first mentioned element and said conveyor for predeterminedly positioning said conveyor with respect to said elements, said means comprising a pair of members one of which presents a converging cam formation and the other of which engages said formation and is located thereby.

29. In a device of the character described, opposed tool supporting elements one of which is movable relatively to the other, said elements when closest together also moving laterally generally in the same direction, an endless revolvable conveyor for conveying stock to said elements for operation upon such stock by the tools supported by said elements, means for positioning stock on said conveyor, means for driving said conveyor in approximate synchronism with movement of said elements and means responsive to relative movement between said first mentioned element and said conveyor for predeterminedly positioning said conveyor with respect to said elements, said means comprising converging cam surfaces and a member which engages said surfaces and is located thereby.

30. A forming machine comprising opposed cooperating forming heads at least one of which is movable toward and away from the other, work guiding means in the form of an endless chain comprising links respectively receiving and positioning work pieces movable between said heads and means on one of said heads engaging said work guiding means to insure proper positioning of said work guiding means with respect to said heads at the time said heads are acting on the work.

31. A forming machine comprising opposed cooperating forming heads at least one of which is movable toward and away from the other, work guiding means movable with respect to said heads, a guide member on said work guiding means and a guide member on one of said heads adapted to cooperate with said first mentioned guide member, one of said guide members being yieldingly mounted in the work guiding means or head carrying it, said guide members insuring proper positioning of said work guiding means with respect to said heads at the time said heads are acting on the work, one of said guide members being a fork adapted to embrace the other thereof at the time said heads are acting on the work.

GUY O. CONNER.